(No Model.)
W. C. AVERY.
METHOD OF MAKING INGOTS FOR PLATED WIRE.
No. 328,871. Patented Oct. 20, 1885.
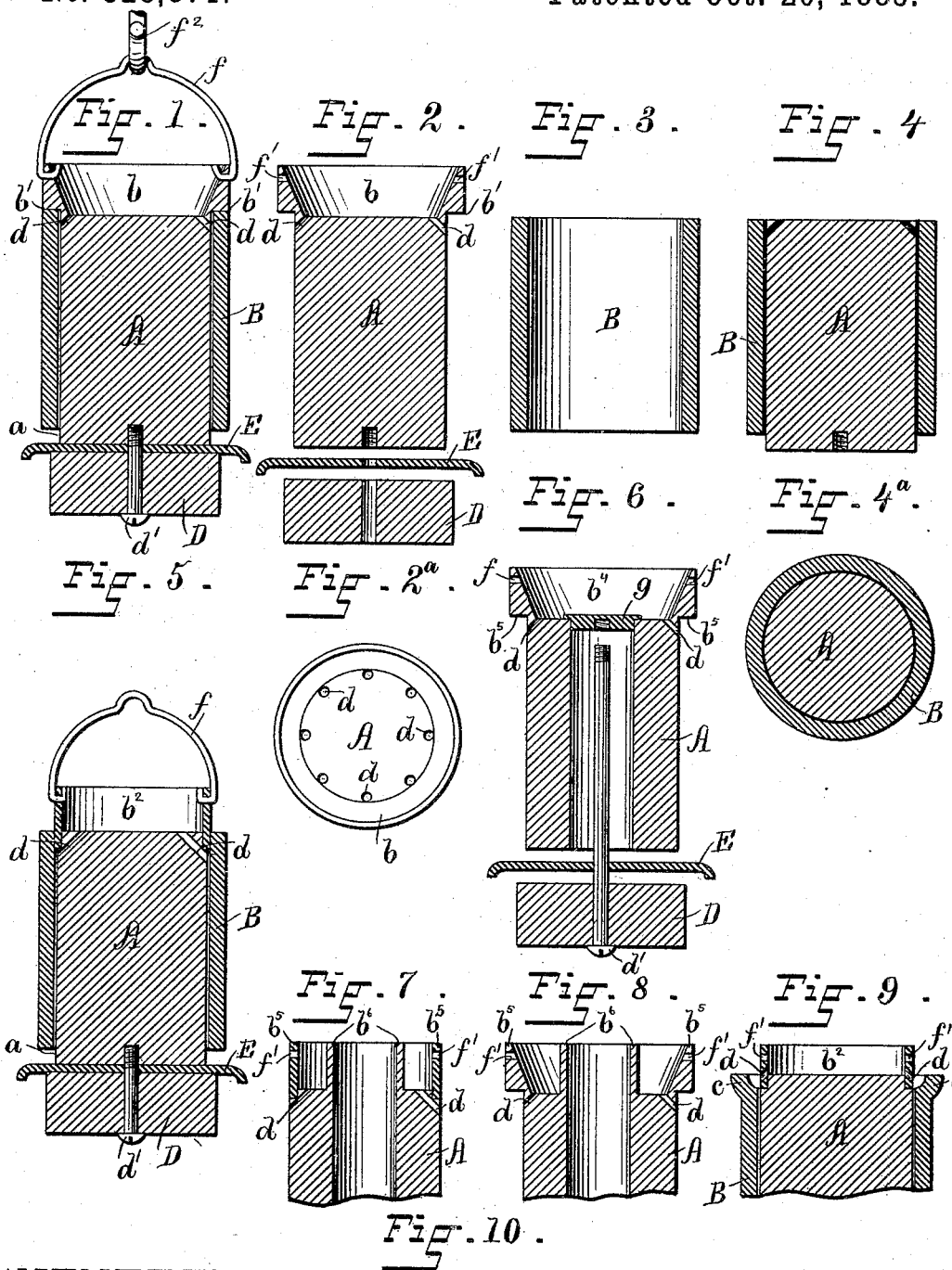
WITNESSES:
Chas. H. Luther Jr.
Jno. L. Coudron
INVENTOR:
William C. Avery
By Joseph A. Miller & Co
Attys

UNITED STATES PATENT OFFICE.

WILLIAM C. AVERY, OF PROVIDENCE, RHODE ISLAND.

METHOD OF MAKING INGOTS FOR PLATED WIRE.

SPECIFICATION forming part of Letters Patent No. 328,871, dated October 20, 1885.

Application filed March 27, 1885. Serial No. 160,153. (No specimens.)

*To all whom it may concern:*

Be it known that I, WILLIAM C. AVERY, of the city and county of Providence, and State of Rhode Island, have invented a new and Improved Method of Making Ingots for Seamless Rolled Plated Wire, of which the following is a full, clear, and exact description, reference being had to the accompanying drawings, forming a part of this specification.

My invention relates to ingots for making drawn or rolled plated wire for jewelers' or others' use. These ingots consist of a core of base metal—such as copper or other suitable metal—upon which is soldered a seamless tube of gold or other metals. Heretofore the tube has been made of greater length than the core, so as to extend beyond one end of the latter, and in the cavity thus formed has been placed a mass of solder. The ingot was then set on end with the cavity uppermost, and subjected to the action of heat for the purpose of melting the solder, which ran down between the outer surface of the core and the inner surface of the tube and united the two parts together. This previous method has been objectionable, because when the soldering was completed the projecting portion of precious metal had to be cut off before the rolling or drawing took place, and thus much waste was produced. Moreover, the projecting portion of the precious metal was liable to become blistered or melted before the melting of the solder, allowing the solder to flow outside of the tube and destroy the ingot, and at the commencement of the rolling or drawing the ingot had to be held directly by its tube of precious metal, which rendered marring extremely liable to occur.

The object of my invention is to avoid the above defects, both in the ingot and in the method of making the same; and to this purpose my invention consists in placing a cavity for the solder upon one end of the core in such manner as to extend beyond the precious-metal tube, and also in protecting the tube from damage by heat by attaching a shield to the opposite end of the core, said end extending beyond the tube.

My invention consists in certain peculiar and novel details of method and construction, all as hereinafter described and claimed.

In order that my invention may be fully understood, I will proceed to describe it with reference to the accompanying drawings, in which—

Figure 1 is a longitudinal section of an ingot embodying my invention. Fig. 2 is a similar view of the core and its attachments removed from the tube. Fig. $2^a$ is an upper end plan view of the same. Fig. 3 is a longitudinal section of the tube. Fig. 4 is a similar view of the ingot after the soldering process. Fig. $4^a$ is a horizontal section of the same. Fig. 5 is a longitudinal section of a modified form of my invention. Fig. 6 is a similar view of a modified form of the core and its attachments removed from the tube. Figs. 7 and 8 are similar views of the upper ends of modified forms of cores. Figs. 9 and 10 are similar views of still further modifications of my invention.

In the said drawings, A designates the core, which is of copper or any other metal which is adapted for drawing or rolling, and B is the tube or sheath, which is of gold or other precious metal, formed by any suitable means into a seamless tubular shape.

The core A is provided with a cavity at its upper end, and said cavity may be either formed directly into the mass of the core or by an attachment to the upper end. As shown in Figs. 1 and 2, this cavity is formed by a ring, $b$, which is integral with the mass of the core, and has shoulders, $b'$, against which the upper end of tube B rests. In Fig. 5 the cavity is shown as formed by a ring, $b^2$, separate from the core and fitted around the reduced upper end of said core, so as to lie between it and the tube B. In Fig. 9 the ring $b^2$ is shown as interposed between the reduced end of the core and the flared end $c$ of the tube B. In Fig. 10 the cavity is formed directly in the mass of the core, so as to leave the straight wall $b^3$. In Fig. 6 the cavity is likewise shown as formed directly in the mass of the core, so as to leave the wall $b^4$ with shoulders, $b^5$. In Figs. 7 and 8 the cavity is formed circularly upon the upper end of the core, and thus leaves the walls $b^5$ $b^6$, which hold the solder within the cavity. The inner faces of the walls $b^5$ in Fig. 8 are shown as flared or inclined outwardly, while the said walls in Fig. 7 are parallel with the walls $b^6$. These different forms of the cavity serve to hold more or less solder, and are each adapted to serve certain peculiar purposes in the art to which my invention relates, as will be readily understood by those conversant with this art. In each instance, however, the cavity is connected with the exterior of the core, and consequently with the space between the core and tube, by a number of ducts, $d$, which serve to allow the melting solder to flow from the cavity downward between the core and the tube, so as to firmly unite the two. The walls of the cavity extend beyond the end of the tube, so that when the soldering operation is completed the walls may be cut off or removed from the core.

D designates a thick metal block, which is secured to the lower end of the core by a screw, $d'$, and E designates a thin metal washer, which is interposed between the block and the core. The purpose of this block is to protect the tube from direct heat by receiving the great volume of heat and to conduct it through the core and thus avoid blistering of the tube. The washer is to intercept any surplus solder flowing from the bottom of the tube, indicating that the solder has passed the entire length of the tube.

$f$ designates a bail, the ends of which are inserted into holes, $f'$, in the outer wall of the cavity. The lower end, $a$, of core A extends below the lower end of tube B, so that after the soldering operation a hold may be taken upon the core without injuring the tube during the operation of drawing.

The general operation of my invention is as follows: The tube B, after having been made by any suitable means, is placed upon the core A in such position that the cavity of the core shall extend above the tube, and that the tube shall extend above the ducts $d$. A quantity of solder is now placed in the cavity, and the ingot is suspended by its bail $f$ to a hook, $f^2$, in a suitable furnace. The bail is attached by its hook to a revolving frame, so that the ingot shall be kept rotating in the furnace or heating-chamber. The solder gradually melts and flows through the ducts and down between the core and tube. When the solder reaches the lower end of the tube, it falls upon washer E, and shows that the soldering operation has been completed. The ingot is now removed from the furnace, and the bail and block and washer are removed, after which the ingot is ready for drawing or rolling. Previous to rolling the walls of the cavity are cut off, so as to give the ingot the form shown in Fig. 4, the lower end of the core serving to afford a hold upon the ingot at the commencement of the drawing.

In Figs. 6, 7, and 8 the core is shown a having a central longitudinal channel, through which the screw $d'$ extends, and upon the upper end of which is placed a plate, $g$, into which the screw works. This channel serves not only to facilitate the action of the heat, but also produces a hollow core, which is desirable for drawing or rolling purposes.

Having thus described my invention, I claim as new and desire to secure by Letters Patent—

1. The improved method of forming ingots for seamless plated wire, the same consisting in forming a cavity at the upper end of the core, then placing a tube around the core so that the cavity and the lower end of the core shall project beyond the tube, then supplying the cavity with solder, and subjecting the ingot to the action of the heat, as set forth.

2. The improved method of forming ingots for seamless plated wire, consisting in forming a cavity at the upper end of the core, then placing a tube around the core so that the cavity and the lower end of the core shall project beyond the tube, then attaching a shield to the lower end of said core, filling the cavity with solder, and finally subjecting the ingot to heat, as described.

3. The improved method of forming ingots for seamless plated wire, consisting in forming a cavity to receive solder in one end of the core and then placing a tube around the core, so that the cavity shall extend beyond the tube, as specified.

WILLIAM C. AVERY.

Witnesses:
J. A. MILLER, Jr.,
M. F. BLIGH.